US007420705B2

(12) United States Patent
Yamada et al.

(10) Patent No.: US 7,420,705 B2
(45) Date of Patent: Sep. 2, 2008

(54) IMAGE PROCESSING APPARATUS, IMAGE PROCESSING METHOD, PROGRAM AND STORAGE MEDIUM

(75) Inventors: Osamu Yamada, Tokyo (JP); Makoto Torigoe, Tokyo (JP); Yuji Akiyama, Kanagawa (JP); Takuya Shimada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 931 days.

(21) Appl. No.: 10/235,813

(22) Filed: Sep. 6, 2002

(65) Prior Publication Data
US 2003/0048464 A1 Mar. 13, 2003

(30) Foreign Application Priority Data
Sep. 7, 2001 (JP) ............................. 2001-271818
Jul. 22, 2002 (JP) ............................. 2002-212615

(51) Int. Cl.
*B41J 1/00* (2006.01)
*G06F 15/00* (2006.01)
(52) U.S. Cl. ........................ 358/1.9; 358/520; 382/162; 382/163; 345/156
(58) Field of Classification Search ......... 382/162–167; 358/1.9, 520; 345/156
See application file for complete search history.

(56) References Cited
U.S. PATENT DOCUMENTS
5,742,296 A 4/1998 Yamada et al. ............... 345/431

| | | | |
|---|---|---|---|
| 5,933,252 A | 8/1999 | Emori et al. | 358/500 |
| 6,005,968 A | 12/1999 | Granger | 382/162 |
| 6,014,457 A * | 1/2000 | Kubo et al. | 382/167 |
| 6,088,038 A * | 7/2000 | Edge et al. | 345/600 |
| 6,198,843 B1 | 3/2001 | Nakauchi et al. | 382/167 |
| 7,003,151 B2 * | 2/2006 | Shimada | 382/162 |

FOREIGN PATENT DOCUMENTS

| | | |
|---|---|---|
| EP | 0 546 773 A2 | 4/1992 |
| JP | 11-232073 | 8/1999 |
| JP | 2000-062253 | 2/2000 |
| JP | 2002-112058 | 4/2002 |
| WO | WO 99/01982 | 1/1999 |

* cited by examiner

*Primary Examiner*—King Poon
*Assistant Examiner*—Quang N Vo
(74) *Attorney, Agent, or Firm*—Fitzpatrick, Cella, Harper & Scinto

(57) ABSTRACT

Image data of a color patch is created using a printer profile according to a color conversion method and the image output apparatus 3 prints and outputs the color patch on a storage medium using the image data of this color patch. The color of each color patch recorded on the above-described storage medium is measured using the colorimeter 20, and the matching accuracy calculation section 8 calculates the accuracy (CRI) of color matching using the measurement data of the measurement result. The matching accuracy decision section 9 compares the CRI and a present threshold TH, decides the quality of the accuracy of color matching and notifies the decision result.

13 Claims, 13 Drawing Sheets

FIG. 5

TABLE 1

| No. | Name | R | G | B | PnL | PnC | PnH | TnLp | TnLm | TnCp | TnCm | TnHp | TnHm |
|---|---|---|---|---|---|---|---|---|---|---|---|---|---|
| 1 | Red | 255 | 0 | 0 | 53.33 | 57.43 | 43.29 | 1.2 | 3.0 | 0.1 | 5.0 | 3.8 | 4.8 |
| 2 | Green | 0 | 255 | 0 | ##.## | ##.## | ##.## | #.# | #.# | #.# | #.# | #.# | #.# |
| 3 | Blue | 0 | 0 | 255 | ##.## | ##.## | ##.## | #.# | #.# | #.# | #.# | #.# | #.# |
| 4 | Cyan | 0 | 255 | 255 | ##.## | ##.## | ##.## | #.# | #.# | #.# | #.# | #.# | #.# |
| 5 | Mage | 255 | 0 | 255 | ##.## | ##.## | ##.## | #.# | #.# | #.# | #.# | #.# | #.# |
| 6 | Yellow | 255 | 255 | 0 | ##.## | ##.## | ##.## | #.# | #.# | #.# | #.# | #.# | #.# |

TABLE 2

| No. | Name | R | G | B | PnL | PnC | PnH | TnLp | TnLm | TnCp | TnCm | TnHp | TnHm |
|---|---|---|---|---|---|---|---|---|---|---|---|---|---|
| 1 | Red | 255 | 0 | 0 | ##.## | ##.## | ##.## | #.# | #.# | #.# | #.# | #.# | #.# |
| 2 | Green | 0 | 255 | 0 | ##.## | ##.## | ##.## | #.# | #.# | #.# | #.# | #.# | #.# |
| 3 | Blue | 0 | 0 | 255 | ##.## | ##.## | ##.## | #.# | #.# | #.# | #.# | #.# | #.# |
| 4 | Cyan | 0 | 255 | 255 | ##.## | ##.## | ##.## | #.# | #.# | #.# | #.# | #.# | #.# |
| 5 | Mage | 255 | 0 | 255 | ##.## | ##.## | ##.## | #.# | #.# | #.# | #.# | #.# | #.# |
| 6 | Yellow | 255 | 255 | 0 | ##.## | ##.## | ##.## | #.# | #.# | #.# | #.# | #.# | #.# |

TABLE 3

| No. | Name | R | G | B | PnL | PnC | PnH | TnLp | TnLm | TnCp | TnCm | TnHp | TnHm |
|---|---|---|---|---|---|---|---|---|---|---|---|---|---|
| 1 | Red | 255 | 0 | 0 | ##.## | ##.## | ##.## | #.# | #.# | #.# | #.# | #.# | #.# |
| 2 | Green | 0 | 255 | 0 | ##.## | ##.## | ##.## | #.# | #.# | #.# | #.# | #.# | #.# |
| 3 | Blue | 0 | 0 | 255 | ##.## | ##.## | ##.## | #.# | #.# | #.# | #.# | #.# | #.# |
| 4 | Cyan | 0 | 255 | 255 | ##.## | ##.## | ##.## | #.# | #.# | #.# | #.# | #.# | #.# |
| 5 | Mage | 255 | 0 | 255 | ##.## | ##.## | ##.## | #.# | #.# | #.# | #.# | #.# | #.# |
| 6 | Yellow | 255 | 255 | 0 | ##.## | ##.## | ##.## | #.# | #.# | #.# | #.# | #.# | #.# |

FIG. 9

| No. | Name | MATCHING ACCURACY |
|---|---|---|
| 1 | Red | 0.19 |
| 2 | Green | 0.91 |
| 3 | Blue | 0.17 |
| 4 | Cyan | 1.28 |
| 5 | Magenta | 0.15 |
| 6 | Yellow | 1.02 |

901

IMAGE PROCESSING APPARATUS, IMAGE PROCESSING METHOD, PROGRAM AND STORAGE MEDIUM

FIELD OF THE INVENTION

The present invention relates to an image processing apparatus, image processing method, program and storage medium.

BACKGROUND OF THE INVENTION

With the widespread proliferation of personal computers, images are conventionally input as electronic data by an image input apparatus such as a digital camera and color scanner, and the input images are displayed, checked, edited, processed or modified according to various purposes of use by an image display apparatus such as a CRT and LCD and output by an image output apparatus such as a color printer. Recently, it is also often the case that images taken by a digital camera are directly output by a color printer without displaying them on a color monitor. Furthermore, CG images created on a computer are also output to a color printer, that is, a way of use without requiring any image input apparatus.

When images are handled among different input/output apparatuses such as a digital camera, color scanner, color monitor and color printer as shown above, their color reproduction characteristic and color reproduction range vary from one apparatus to another. Thus, a technique called a "color management system" (hereinafter referred to as "CMS") which matches color reproductions among different image processing apparatuses has emerged. The CMS consists of a device profile that describes color reproduction characteristics of various image processing apparatuses and a color matching method that performs color conversion, etc. Realizing consistent color reproduction among various image processing apparatuses requires the accuracy of the above-described device profile and color matching method to be improved, and therefore the device profile is updated as appropriate.

Here, there is a plurality of color conversion methods according to the contents of images and the purpose of color conversion, etc. For example, there are a method of matching a monitor display and printer output, a method of converting print output in a preferred manner, a method of converting the print output as clearly as possible or in such a way that the color zones of the printer can be used as widely as possible, etc. The above-described color conversion methods also include a color conversion method which uses corresponding colors for output color signals corresponding to input color signals.

However, in the above-described examples, the device profile is not necessarily updated on appropriate occasions. Instead, the device profile is updated periodically, or, in the case of color matching between the monitor and device, for example, it is updated when the user deems it necessary to update by comparing display colors on a color monitor and an output result from a color printer when matching the monitor and printer, and thus there are no clear criteria as to whether or not to update the profile. Moreover, the criteria are subjective and ambiguous, dependent on a decision based on perception by the human eyes and not based on quantified criteria. Japanese Patent Laid-Open No. 11-232073 discloses details on updating a device profile for improving the accuracy of matching among various color image processing apparatuses, but it again discloses that the device profile is updated under the user's visual check, failing to provide clear criteria or quantification.

On the other hand, there are also cases where it is objectively decided whether or not to update the profile. However, in this case of monitor matching, attention is simply focused on a color difference in colorimetric values between the color monitor display color and color printer output color. Thus, according to a color conversion method whereby matching is performed between light source colors displayed on a color monitor, etc. and object colors output to a color printer, etc., how the respective colors appear varies from one color to another and even if colorimetric values are matched, they do not appear as the same color, in other words, the above-described color conversion method does not employ criteria that reflect how colors appear in the human eyes and has a problem that it cannot precisely decide the accuracy in color conversion. On the other hand, the method of converting printed objects in a preferred manner has difficulty in quantifying the subjective content of such preferences and has a problem that it is unable to precisely decide the accuracy in color conversion.

The present invention has been implemented taking into account the problems described above and it is an object of the present invention to provide an image processing apparatus, image processing method and storage medium that seeks to achieve color matching accuracy according to objective criteria based on human visual characteristics.

It is another object of the present invention to provide an image processing apparatus, image processing method and storage medium capable of exactly verifying the color conversion accuracy for each color conversion content, updating a device profile as appropriate and performing color conversion accurately.

SUMMARY OF THE INVENTION

In order to achieve the object of the present invention, for example, an image processing apparatus comprises storing means that stores data of a first color group including at least one color in association with data of a second color group made up of colors obtained by allowing an image output apparatus to output the colors of the first color group, the colors having a predetermined relationship with the colors of the first color group, and calculating means for inputting from the outside data indicating a color group obtained by allowing the image output apparatus to output the input color group, calculating a lightness error, chroma error and hue error using the data and the corresponding color group data corresponding to the input color group stored in the storing means and further calculating a color reproduction index for color matching using these errors.

In order to achieve the object of the present invention, for example, an image processing method comprises the steps of storing data of a first color group including at least one color in association with data of a second color group made up of colors obtained by allowing an image output apparatus to output the colors of the first color group in memory, the colors having a predetermined relationship with the colors of the first color group, and inputting from the outside data indicating a color group obtained by allowing the image output apparatus to output the input color group, calculating a lightness error, chroma error and hue error using the data and the corresponding color group data for the input color group stored in the memory and further calculating a color reproduction index for color matching using these errors.

In order to achieve the object of the present invention, for example, an image processing apparatus comprises image processing means for converting an input image signal to an output image signal, wherein the image processing means comprises a plurality of color converting means, accuracy calculating means for calculating the accuracy of the color conversion, and accuracy deciding means for deciding whether the accuracy result calculated by the accuracy calculating means is larger or smaller than a preset threshold.

In order to achieve the object of the present invention, for example, an image processing method comprises an image processing step of converting an input image signal to an output image signal, wherein the image processing step comprises a plurality of color conversion steps, an accuracy calculating step of calculating the accuracy of the color conversion, and an accuracy deciding step of deciding whether the accuracy result calculated in the accuracy calculating step is larger or smaller than a preset threshold.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 illustrates table configuration examples of various color conversion methods;

FIG. 9 illustrate a GUI display example of matching accuracy for each patch color, that is, CRIn displayed on the image display apparatus 2;

DETAILED DESCRIPTION OF THE PREFERRED EMBODIMENTS

Preferred embodiments of the present invention will now be described in detail in accordance with the accompanying drawings.

With reference now to the attached drawings, embodiments of the present invention will be explained in detail below.

First Embodiment

<Basic Configuration of Image Processing Apparatus>

Figure 1:
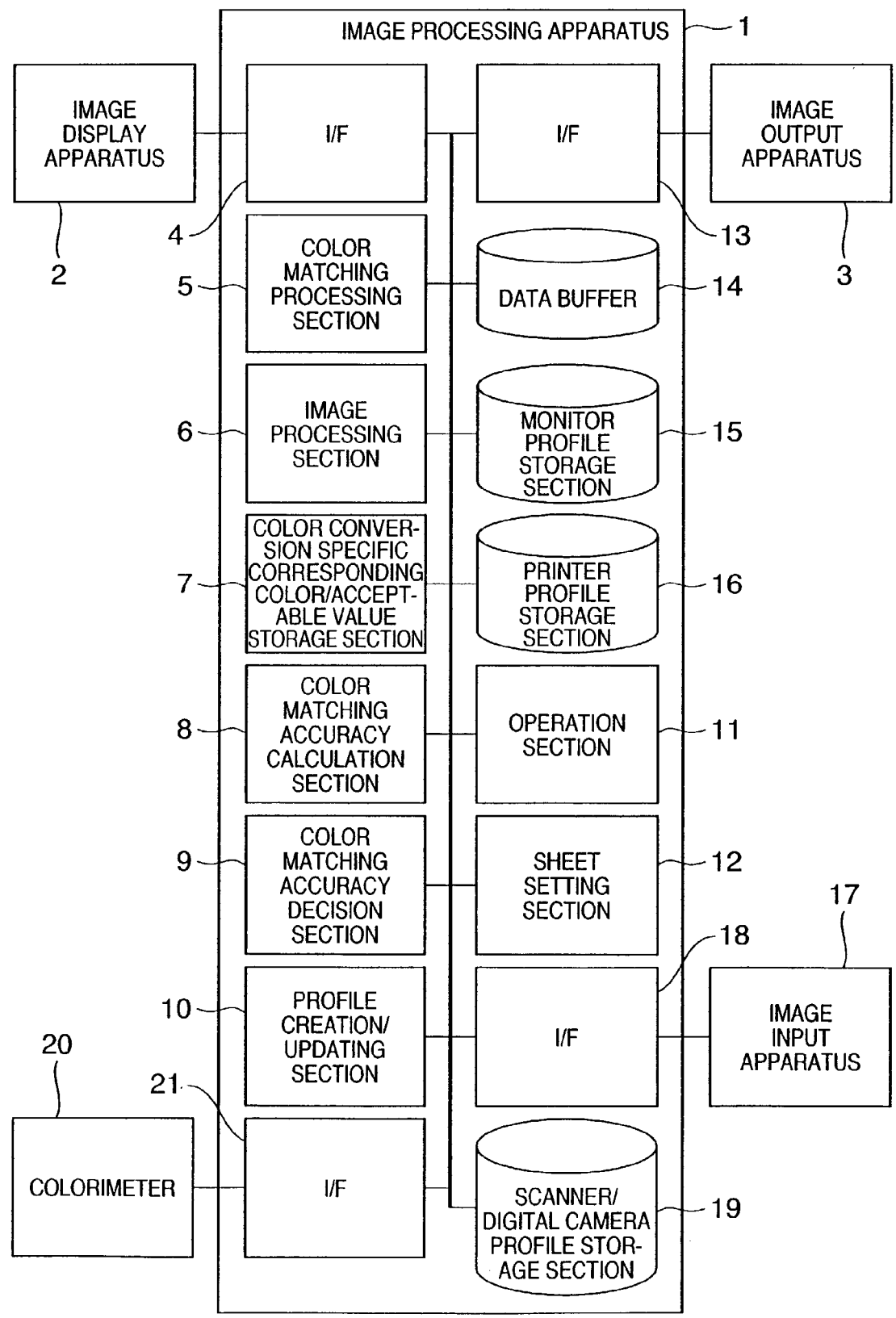
FIG. 1 is a block diagram showing a functional configuration of an image processing apparatus according to a first embodiment of the present invention and showing peripheral apparatuses thereof.

FIG. 1 is a block diagram showing a functional configuration of an image processing apparatus according to a first embodiment of the present invention and showing peripheral apparatuses thereof. Reference numeral 1 denotes an image processing apparatus main unit, 2 denotes an image display apparatus, which is constructed of a CRT and LCD, etc. and displays images. Reference numeral 3 denotes an image output apparatus, which is an apparatus that prints out images on an image storage medium such as paper and OHP. This embodiment handles the image output apparatus 3 as a printer, but the image output apparatus 3 is not limited to a printer and can be any apparatus if it is an apparatus having at least a function of printing images on the above-described image storage medium.

Reference numeral 4 denotes an interface (I/F) section that connects the image display apparatus 2 to the image processing apparatus 1, 5 denotes a color matching processing section that performs color matching between the color input from an image input apparatus 17 and the color output from the image output apparatus 3, 6 denotes an image processing section that performs various kinds of image processing such as gradation conversion on the images output to the image output apparatus 3.

Reference numeral 7 denotes a color conversion specific corresponding color/acceptable value storage section that stores corresponding colors for respective color conversions and acceptable values thereof (corresponding colors of respective color conversions and their acceptable values will be described in detail later), 8 denotes a color matching accuracy calculation section that calculates the color matching accuracy according to a method which will be described later, 9 denotes a color matching accuracy decision section that decides the color matching accuracy using the result of the accuracy calculated by the color matching accuracy calculation section 8, 10 denotes a profile creation/updating section that creates or updates a device profile to be used for color matching (profile such as a printer profile, monitor profile, scanner/digital camera profile, etc. which will be described later) and 11 denotes an operation section for the user to input various commands to the image processing apparatus 1.

Reference numeral 12 denotes a sheet setting section that sets the type of an output sheet to be used for the image output apparatus 3, 13 denotes an I/F section to connect the image output apparatus 3 to the image processing apparatus 1, 14 denotes a data buffer that temporarily stores data to carry out data processing, 15 denotes a monitor profile storage section that stores monitor profiles of the image display apparatus 2, etc. for each color conversion method, 16 denotes a printer profile storage section that stores printer profiles of the image output apparatus 3 for each color conversion method, 17 denotes an image input apparatus such as a scanner and digital camera that can input images as electronic data to the image processing apparatus 1, 18 denotes an I/F section to connect the image input apparatus 17 to the image processing apparatus 1 and 19 denotes a scanner/digital camera profile storage section that stores profiles of the image input apparatus 17 such as a scanner and digital camera for each color conversion method.

Reference numeral 20 denotes a calorimeter that measures colors of various color patches printed on the storage medium output from the image output apparatus 3. Reference numeral 21 denotes an I/F section to connect the calorimeter 20 to the image processing apparatus 1.

<Overall Processing>

The following is an explanation of an image processing method for allowing the image output apparatus 3 to output a color patch according to a printer profile corresponding to specified color conversion, reading the measurement result of the colorimeter 20, calculating a difference between the color captured and the corresponding color corresponding to the specified color conversion (the difference will be described in detail later; this difference is called "accuracy of color matching") and presenting information as to whether or not to update a printer profile according to the accuracy. In the following explanation, a printer profile is used as a profile to be updated, but the profile is not limited to this and can also be a monitor profile, for example.

Figure 2:
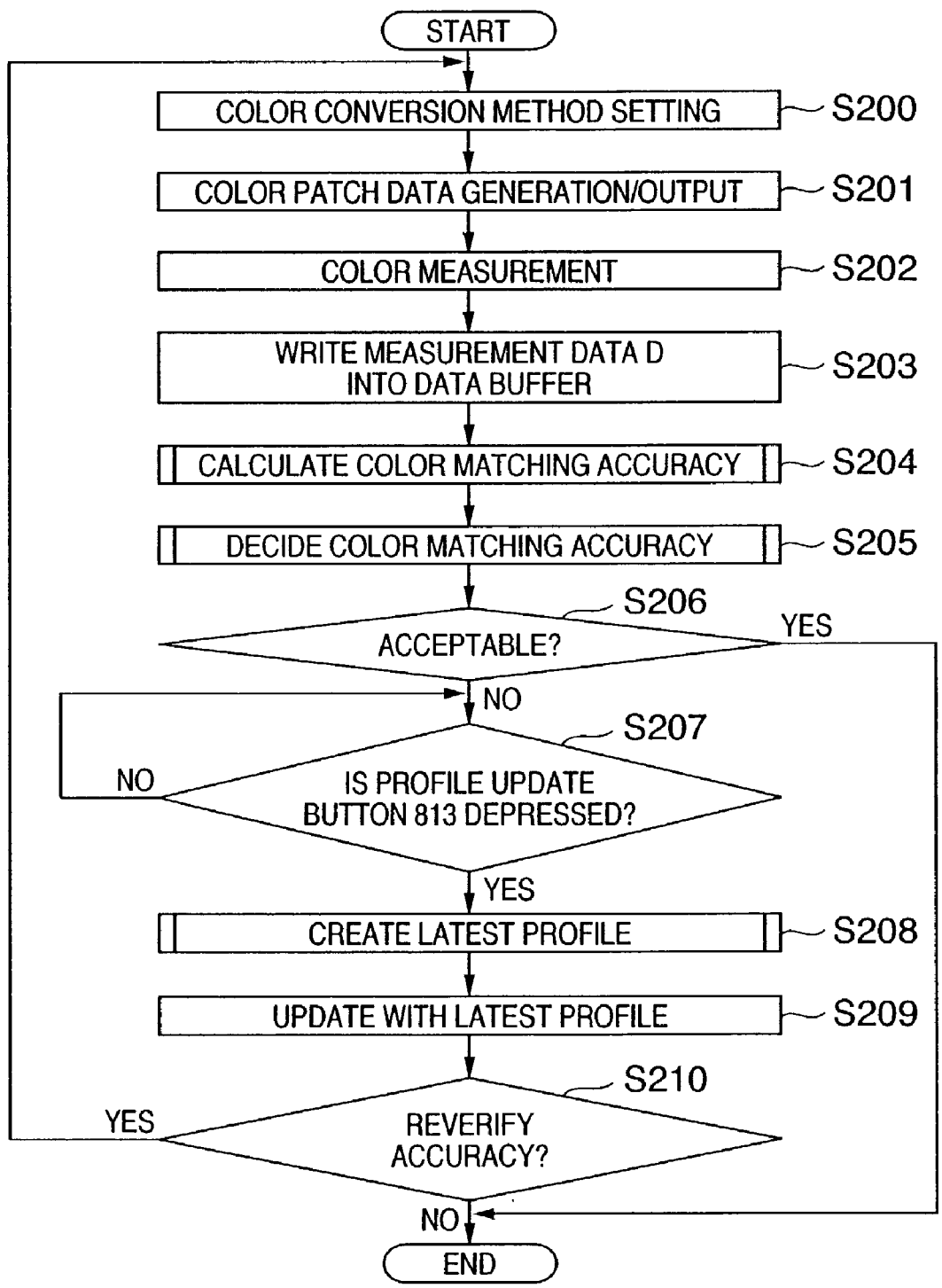
FIG. 2 is a flow chart of main image processing carried out by the image processing apparatus according to the first embodiment of the present invention.
Figure 8:
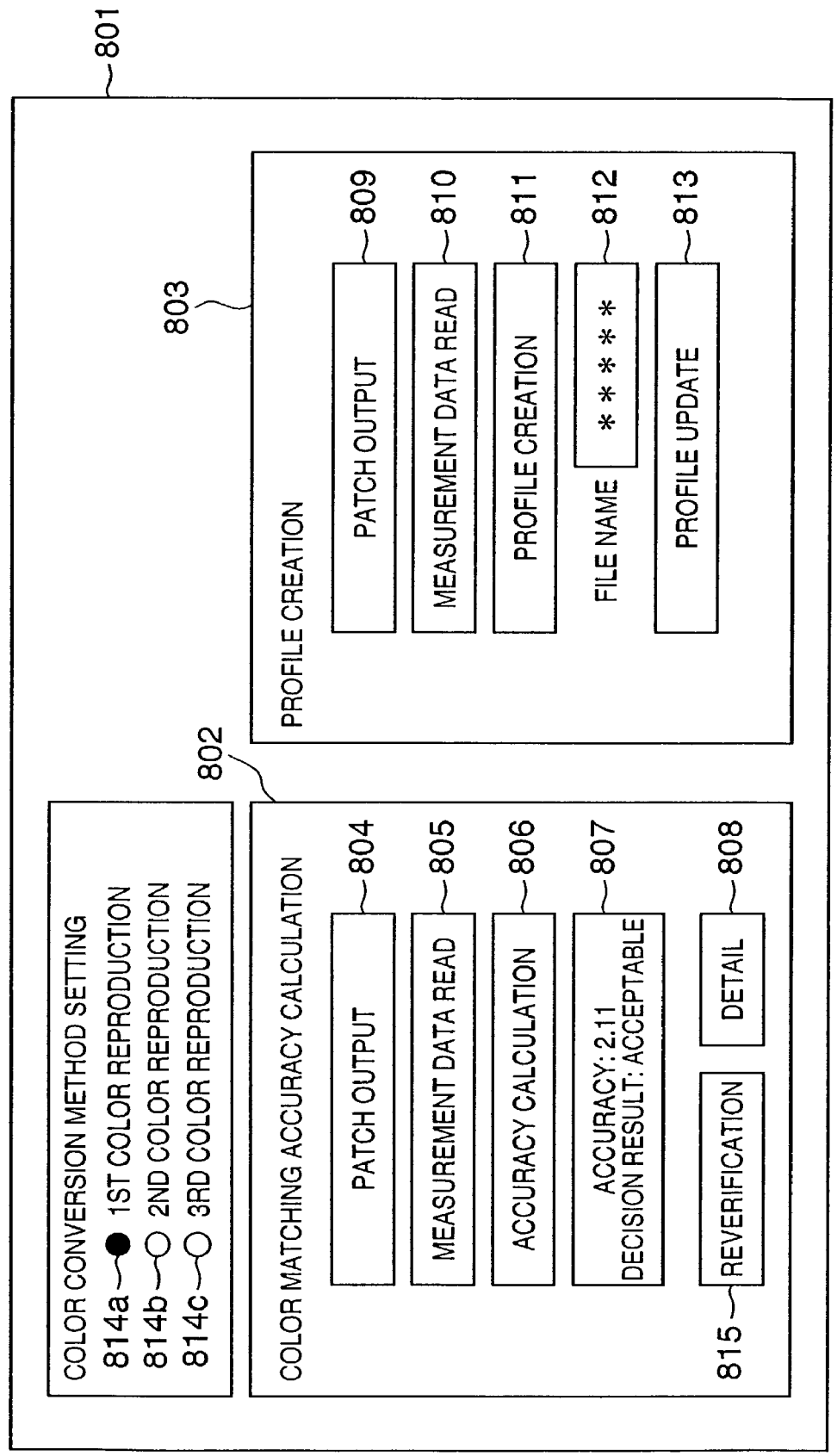
FIG. 8 illustrate a GUI configuration example displayed on an image display apparatus 2.

FIG. 2 is a flow chart of main processing of this image processing. Furthermore, FIG. 8 illustrates a GUI configuration example displayed on the image display apparatus 2 to execute various kinds of processing which will be described later. The following is an explanation of the processing of calculating the accuracy of color matching, creating and updating a printer profile according to the accuracy calculated with reference to FIG. 2 and FIG. 8.

First, the user specifies and selects any one of check buttons 814a, 814b and 814c of the color conversion method using the operation section 11 (the black circle indicates the color conversion method selected). Then, the accuracy of color matching according to the selected color conversion method will be calculated as follows. The selectable color conversion methods are not limited to these three methods. Thus, in step S200, the selected color conversion method will be set as the one that will be used in the following processing.

Then, in step S201, it is detected whether the patch output button 804 is depressed by the user using the operation section 11 or not, color patch image data is created from the printer profile storage section 16 using the printer profile according to the color conversion method set in step S200 and output to the data buffer 4. The image output apparatus 3 prints and outputs the color patch on a storage medium such as paper and OHP using the image data of this color patch. This embodiment uses patches of six colors R, G, B, C, M and Y as the color patch, but the number of colors is not limited to this.

Then, in step S202, the color of each color patch recorded on the above-described storage medium is measured by the calorimeter 20. Then, in step S203, it is detected whether the measurement data reading button 805 is depressed by the user using the operation section 11 or not and measurement data Dn (n: an index indicating each color (patch) and 1≦n≦6 in this embodiment) which is the result of the above measurement is input to the data buffer 14. This measurement result is regarded as a CIELAB value according to the CIE (International Commission of Illumination) in this embodiment.

Next in step S204, it is detected whether the accuracy calculation button 806 is depressed by the user using the operation section 11 or not and the matching accuracy calculation section 8 calculates the accuracy of color matching using the above-described measurement data D. Details of the processing in step S204 will be described later. In this step, a color reproduction index CRI of color matching will be calculated as the accuracy of color matching.

Then, in step S205, the matching accuracy decision section 9 compares this color reproduction index CRI with a preset threshold TH and decides the quality of the accuracy of color matching. The decision result is displayed in an area 807. In the area 807, a value indicating the accuracy of color matching and character information indicating whether the accuracy is acceptable or not are displayed. Details of the decision processing in this step will be described later. Then, in step S206, the matching accuracy decision section 9 decides whether the decision result is acceptable or not (by comparing the color reproduction index CRI with the threshold TH).

If not acceptable, the printer profile should be updated, and therefore in step S207, depressing of a button 813 to instruct an update of the device profile is accepted and the device profile can be updated. When the depressing of the profile update button 813 from the user using the operation section 11 is detected, the process moves on to step S208 where the profile creation/updating section 10 creates a latest printer profile and in step S209, updates the printer profile stored in the printer profile storage section 16 to the latest printer profile created. The processing of creating the latest printer profile will be explained in detail later.

In step S210, in order to update the above-described accuracy of color matching using the updated printer profile, it is decided whether the user has depressed a reverification button 815 using the operation section 11 or not, and if the reverification button 815 is depressed, the process moves on to step S200 and if not depressed, this process ends.

<Calculation of Color Matching Accuracy>

Figure 3:
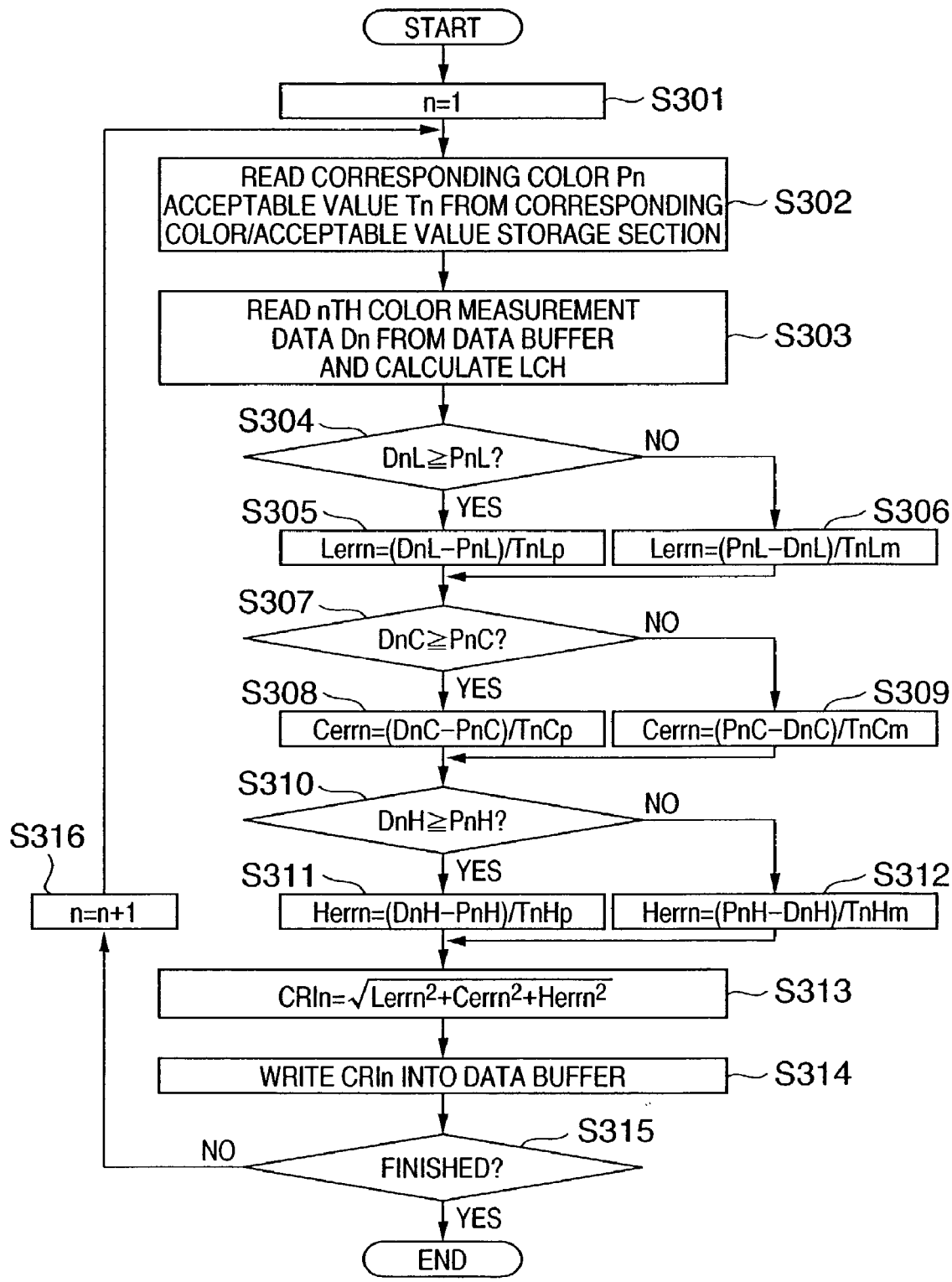
FIG. 3 is a flow chart showing details of processing of calculating the color matching accuracy by the color matching accuracy calculation section 8 in step S204.

FIG. 3 is a flow chart showing details of processing of calculating the color matching accuracy by the color matching accuracy calculation section 8 in step S204 above. The processing of calculating the color matching accuracy using this flow chart will be explained in detail below.

First in step S301, the number of colors n to calculate the color matching accuracy is initialized to 1. Then, in step S302, the nth corresponding color data Pn and acceptable value data Tn (1≦n≦6) registered in the table according to the color conversion method selected and set in step S200 are read from the corresponding color/acceptable value storage section 7.

FIG. 5 illustrates table configuration examples of various color conversion methods. Each table is provided for each color conversion method and is used to realize color reproducibility varying from one color conversion method to another. For example, Table 1 is used for first color reproduction which performs color reproduction visually faithful to the image display apparatus 2, and table 2 is used for second color reproduction which performs preferable color reproduction, table 3 is used for third color reproduction which performs more bright color reproduction. The tables in the same figure can also be provided for each sheet to be printed.

Figure 4:
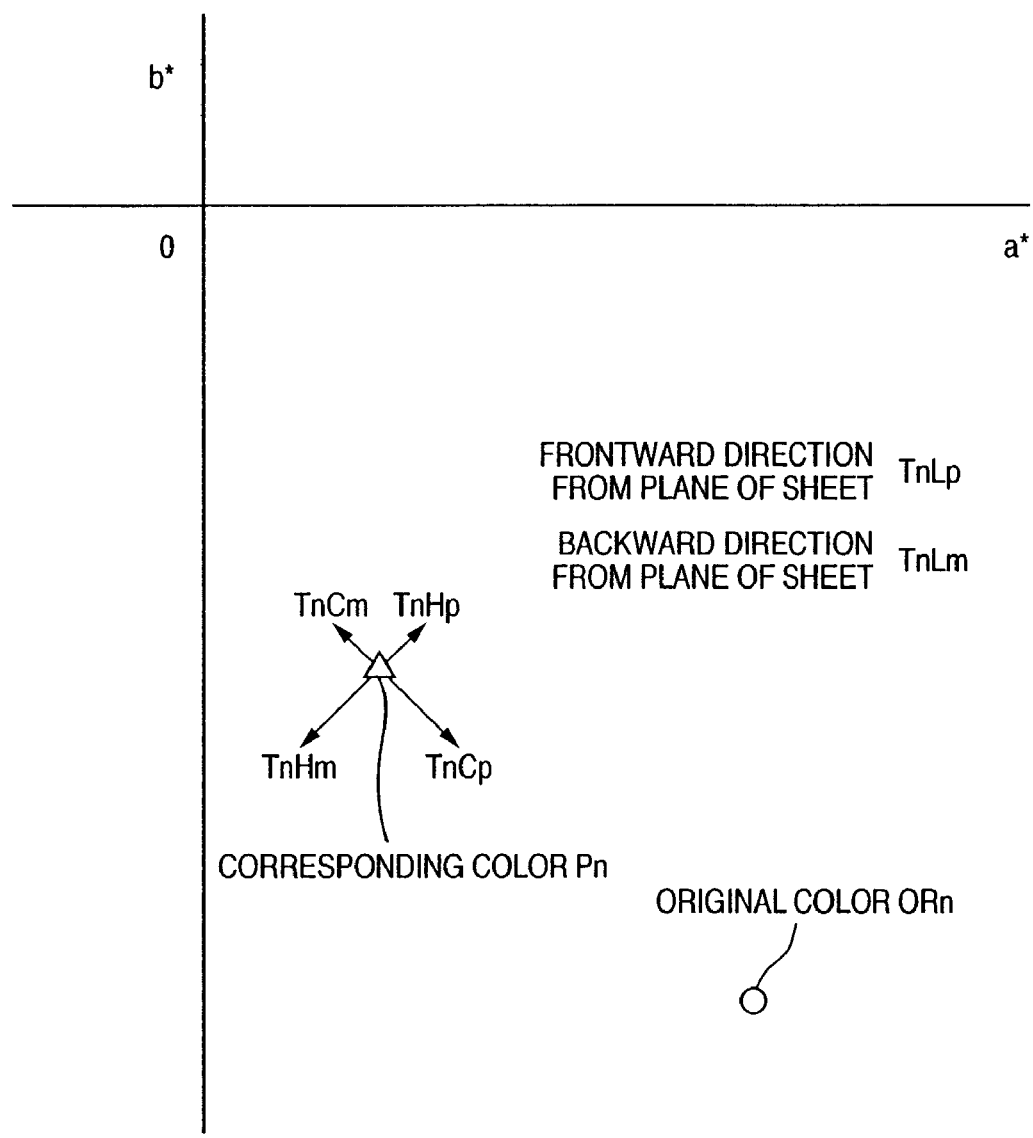
FIG. 4 illustrates an a*b* plane in a CIELAB color space.

Furthermore, corresponding color data Pn and acceptable value data Tn corresponding to six colors are registered in each table. The other items in the same table will be explained using FIG. 4. FIG. 4 illustrates an a*b* plane in a CIELAB color space and it is assumed that the frontward direction from the plane of the sheet is the positive direction of L and the backward direction from the plane of the sheet is the negative direction of L.

An original color ORn (○ mark) indicates, for example, the color displayed on the image display apparatus 2 and the corresponding color Pn (Δ mark) indicates color Pn which matches the original color ORn most and which is to be output by the image output apparatus 3. That is, when the original color is recorded on an image storage medium by the image output apparatus 3, if the color to be recorded is judged to be the same color as the original color through a subjective evaluation, this color to be recorded is the corresponding color that corresponds to the original color.

Then, TnLp and TnLm indicate an acceptable range (TnLp is an acceptable value on the plus side and TnLm is an acceptable value on the minus side) within which it is acceptable that the original color ORn and the corresponding color Pn match with respect to lightness. TnCp and TnCm indicate an acceptable range (TnCp is an acceptable value on the plus side and TnCm is an acceptable value on the minus side) within which it is acceptable that the original color ORn and the corresponding color Pn match with respect to chroma and TnHp and TnHm indicate an acceptable range (TnHp is an acceptable value on the plus side and TnHm is an acceptable value on the minus side) within which it is acceptable that the original color ORn and corresponding color Pn match with respect to hues.

Suppose correlations between the corresponding color Pn for the original color ORn and acceptable values TnLp, TnLm, TnCp, TnCm, TnHp and TnHm are obtained beforehand through subjective evaluation experiments with respect to the monitor display colors and print colors and saved in the corresponding color/acceptable value storage section 7 as the table data as shown in FIG. 5 for each color reproduction.

It goes without saying that it is also possible to set this corresponding color, acceptable value for each image output apparatus or each output sheet and use them for their corresponding purposes. Here, PnL, PnC and PnH in FIG. 5 are color display values LCH in the polar coordinate system of Pn and LCH is converted from a CIELAB value using the following expressions (1) to (3):

$$L^* = L^* \quad (1)$$

$$Cab^* = \sqrt{((a^*) \times (a^*) + (b^*) \times (b^*))} \quad (2)$$

$$Hab = \arctan(b^*/a^*) \quad (3)$$

Back in FIG. 3, in step S303, of the measurement data D written into the data buffer 14 in step S203, the nth measurement data Dn is read from the data buffer 14 and the polar coordinate system color display values DnL, DnC and DnH are calculated using expressions (1) to (3) above. In step S304, the lightness DnL of the nth color patch and the lightness PnL of the nth corresponding point are compared and if DnL≧PnL, the process moves on to step S305 and the accuracy of lightness Le is calculated as:

$$Le = (DnL - PnL)/TnLp$$

That is, a difference between the lightness DnL of the nth color patch and the lightness PnL of the nth corresponding point normalized by the acceptable value TnLp of the lightness on the plus side is calculated. Thus, only when this calculated value Le is 0≦Le≦1, it is possible to accept that the lightness DnL of the nth color patch matches the lightness PnL of the nth corresponding point.

On the other hand, if the comparison result in step S304 is DnL<PnL, the process moves on to step S306 and the accuracy of lightness Le is calculated as:

$$Le = (PnL - DnL)/TnLm$$

That is, only when this calculated value Le is 0≦Le≦1, it is possible to accept that the lightness DnL of the nth color patch matches the lightness PnL of the nth corresponding point.

In step S307, the chroma DnC of the nth color patch and the chroma PnC of the nth corresponding point are compared and if DnC≧PnC, the process moves on to step S308 and the accuracy of chroma Ce is calculated as:

$$Ce = (DnC - PnC)/TnCp$$

That is, a difference between the chroma DnC of the nth color patch and the chroma PnC of the nth corresponding point normalized by the acceptable value TnCp of the chroma on the plus side is calculated. Thus, only when this calculated value Ce is 0≦Ce≦1, it is possible to accept that the chroma DnC of the nth color patch matches the chroma PnC of the nth corresponding point.

On the other hand, if the comparison result in step S307 is DnC<PnC, the process moves on to step S309 and the accuracy of chroma Ce is calculated as:

$$Ce = (PnC - DnC)/TnCm$$

That is, only when this calculated value Ce is 0<Ce≦1, it is possible to accept that the chroma DnC of the nth color patch matches the chroma PnC of the nth corresponding point.

In step S310, the hue DnH of the nth color patch and the hue PnH of the nth corresponding point are compared and if DnH≧PnH, the process moves on to step S311 and the accuracy of hue He is calculated as:

$$He = (DnH - PnH)/TnHp$$

That is, a difference between the hue DnH of the nth color patch and the hue PnH of the nth corresponding point normalized by the acceptable value TnHp of the hue on the plus side is calculated. Thus, only when this calculated value He is 0≦He≦1, it is possible to accept that the hue DnH of the nth color patch matches the hue PnH of the nth corresponding point.

On the other hand, if the comparison result in step S310 is DnH<PnH, the process moves on to step S312 and the accuracy of hue He is calculated as:

$$He = (PnH - DnH)/TnHm$$

That is, only when this calculated value He is 0≦He≦1, it is possible to accept that the hue DnH of the nth color patch matches the hue PnH of the nth corresponding point.

As described above, since Le, Ce and He calculated through the processing above are errors when a maximum value acceptable as matching in the human eyes is assumed to be 1, these values can be handled as equal values for characteristics of the human eyes with respect to the lightness direction, chroma direction and hue direction, respectively.

Next, in step S313, using the error in the lightness direction Le, error in the chroma direction Ce and error in the hue direction He, a color reproduction index CRIn which represents an amount of evaluation indicating the degree of color matching in the human eyes is calculated based on the following expression:

$$CRIn = \sqrt{(Le \times Le + Ce \times Ce + He \times He)}$$

This CRIn indicates the accuracy of color matching between the color of the nth color patch and the nth corresponding color. Then, in step S314, the CRIn calculated is written into the data buffer 14. In step S315, all the processing above is carried out on all color patches, and it is decided whether CRIn has been calculated for all color patches or not (deciding whether n=6 or not) and if CRIn has been calculated for all color patches, the process shown in FIG. 3 is finished and the process moves on to step S205. On the other hand, when n<6, the process moves on to step S316, the data is updated by adding 1 to n and the processes in and after step S302 will be carried out.

<Decision of Color Matching Accuracy>

Figure 6:
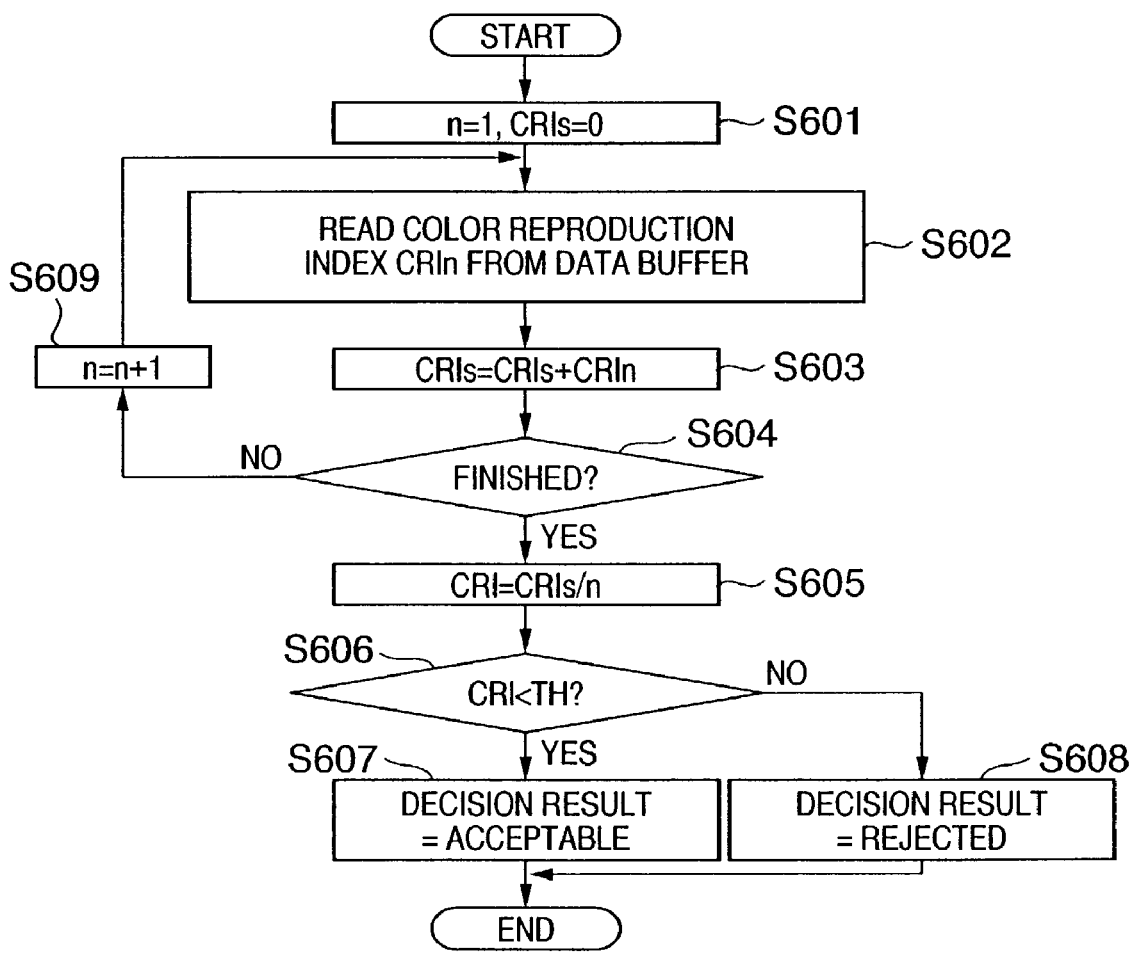
FIG. 6 is a flow chart of processing of deciding the quality of color matching accuracy by the color matching accuracy decision section 9 using the above-described CRIn in step S205.

FIG. 6 is a flow chart of the processing of deciding the quality of the accuracy of color matching carried out by the color matching accuracy decision section 9 using the CRIn above in step S205 above.

First, in step S601, variables CRIs and CRIn which will be used below are initialized to 0 and 1 respectively. Then, in step S602, CRIn is read from the data buffer 14 and added to variable CRIs in step S603. In step S604, it is decided whether CRIn has been added to CRIs for all n or not (deciding whether n=6 or not), and if n<6, the process moves on to step S609, the data is updated by adding 1 to n and the processing in step S602 and S603 is repeated.

On the other hand, if n=6, the process moves on to step S605, a value obtained by dividing CRIs by n(=6) is assigned to variable CRI. That is, the variable CRI indicates a mean value of all CRIn and this CRI is used as a color reproduction index in this embodiment. Then, in step S606, CRI and a preset threshold TH are compared and if CRI <TH, that is, when the mean values of the error in the lightness direction, error in the chroma direction and error in the hue direction for all color patches are smaller than predetermined values, the errors between the respective patch colors and corresponding colors for those colors are small (the degree of color matching in the human eyes is high), and therefore the process moves on to step S607 and the accuracy decision result is regarded as "acceptable." That is, "acceptable" is displayed in the area showing the decision result in the area 807 to notify acceptance.

On the other hand, when CRI≧TH, that is, when the mean values of the error in the lightness direction, error in the chroma direction and error in the hue direction for all color patches are equal to or greater than predetermined values, the errors between the respective patch colors and corresponding colors for those colors are large (the degree of color matching in the human eyes is low), and therefore the process moves on to step S608 and the accuracy decision result is regarded as "rejected." That is, "rejected" is displayed in the area showing the decision result in the area 807 to notify rejection. In either case of step S607 or step S608, the calculated color reproduction index CRI is displayed in the area showing the accuracy in the area 807.

This embodiment displayed the method of notifying the accuracy decision result with characters "acceptable" and "rejected," but the method is not limited to characters, but can also be expressed by images or sound expressing "acceptable" and "rejected."

Though not shown in the above-described flow chart, when the user presses a detail button 808 using the operation section 11, the GU1 illustrated in FIG. 9 appears on the image display apparatus 2. The GUI in FIG. 9 shows matching accuracy for each patch color, that is CRIn.

<Creation of Latest Profile>

Figure 7:
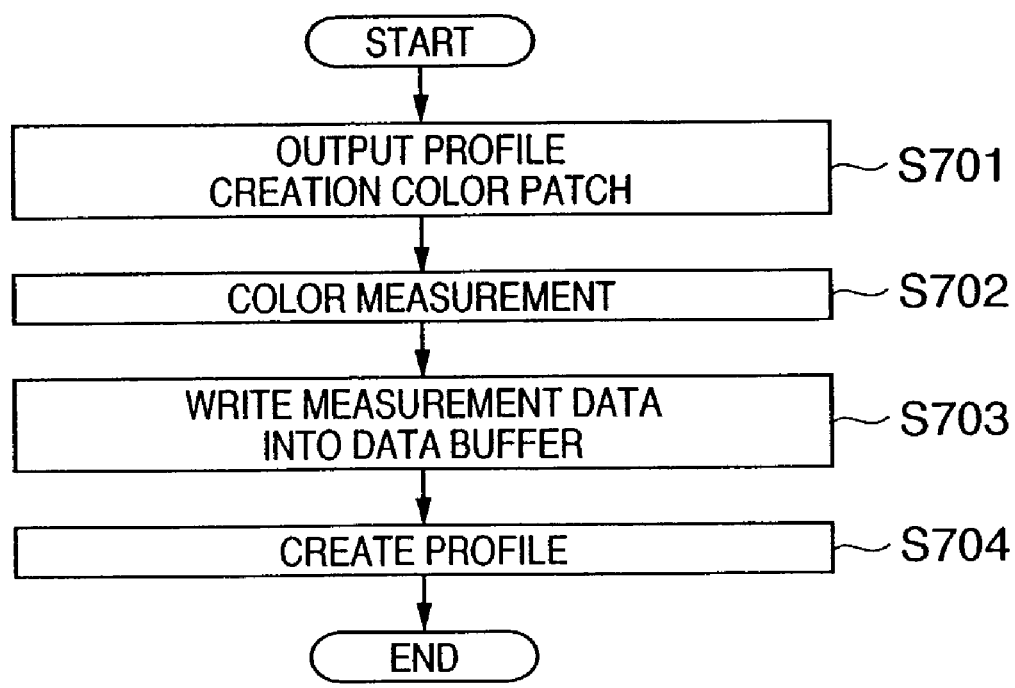
FIG. 7 is a flow chart showing details of processing of updating a printer profile by the profile creation/updating section 10 in step S208.

FIG. 7 is a flow chart showing details of processing of updating a printer profile by the profile creation/updating section 10 in step S208 above. The processing of updating a printer profile to the latest one will be explained in detail using the same flow chart below.

In step S701, the depressing of the patch output button 809 is detected from the user using the operation section 11 and, a profile creation color patch data corresponding to the color selection method selected and set in step S200 is created and output to the image output apparatus 3. Furthermore, the image output apparatus 3 prints and outputs the color patch on a storage medium based on this data. The number of color patch colors to be output here is not limited to a particular value, but, for example, color patches of 729 colors are output, which are combinations of RGB colors by 9 steps each.

In step S702, the calorimeter 20 measures the color of each color patch recorded on the above-described storage medium and when the depressing of the measurement data read button 810 is detected in step S703, the measurement data which is the measurement result is input to the data buffer 14. This measurement result is regarded as a CIELAB value according to the CIE (International Commission of Illumination) in this embodiment. Then, in step S203, the depressing of the measurement data read button 805 by the user using the operation section 11 is detected and the above-described measurement data D is written into the data buffer 14.

In step S704, the depressing of the profile creation button 811 is detected from the user using the operation section 11, and a printer profile according to the color conversion method selected and set in step S200 is created according to a predetermined format. Furthermore, the user can also input a desired profile name in the file name window 812 using the operation section 11.

As described above, by verifying the accuracy of color matching using the corresponding color Pn corresponding to the original color OR and its acceptable area Tn, it is possible to verify the accuracy of color matching using objective criteria based on the human visual characteristics and update the profile as appropriate.

Second Embodiment

Figure 10:
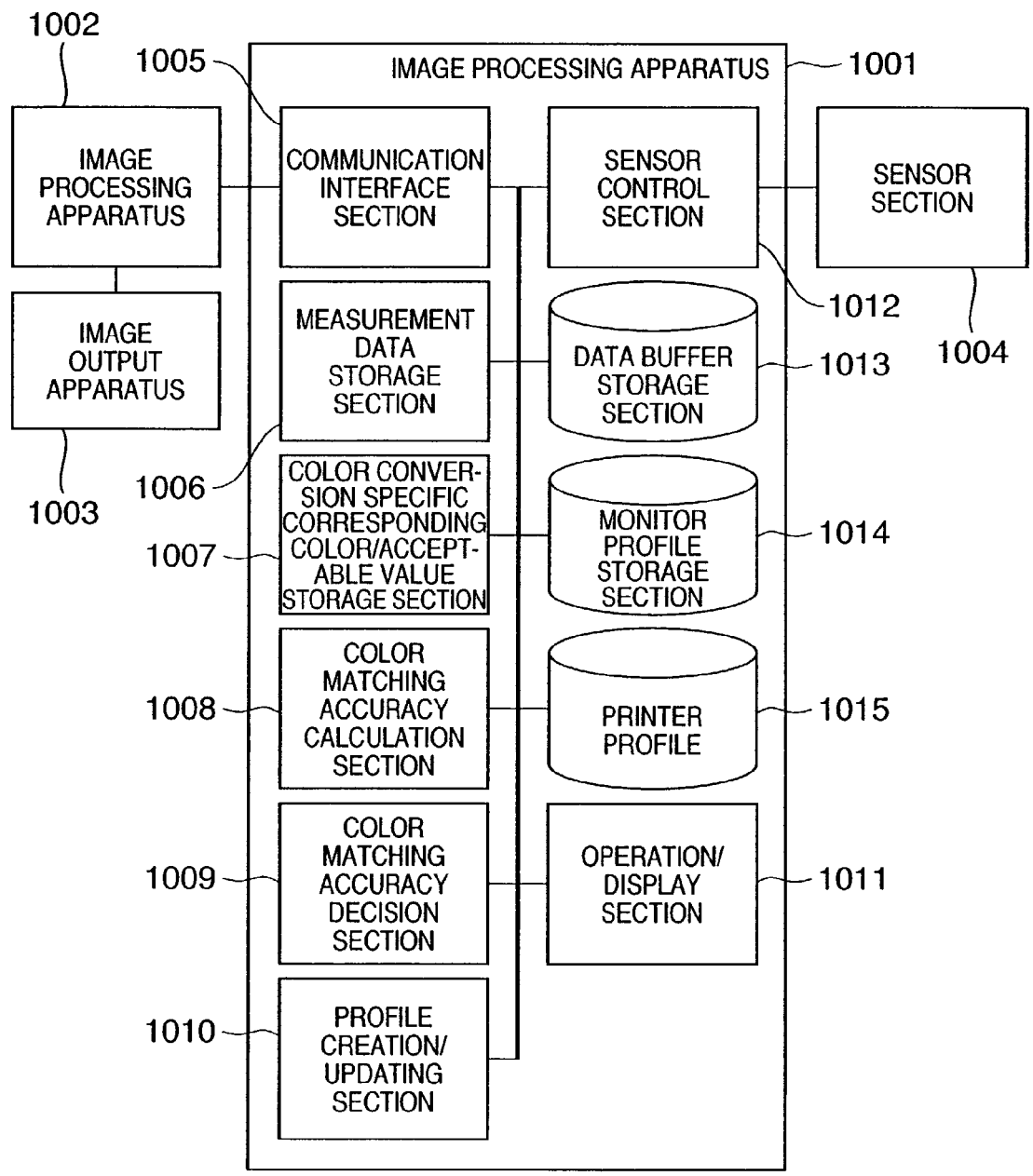
FIG. 10 is a block diagram showing a functional configuration of an image processing apparatus according to a second embodiment of the present invention and showing peripheral apparatuses thereof.

FIG. 10 shows a functional configuration of an image processing apparatus according to this embodiment and shows peripheral apparatuses thereof. Reference numeral 1001 denotes an image processing apparatus main unit in this embodiment and it is possible to connect a sensor (sensor section 1004) for color measurement thereto. Suppose the image processing apparatus in this embodiment is a portable image processing apparatus such as a PDA and notebook personal computer.

Reference numeral 1002 denotes an external image processing apparatus connected to the image processing apparatus 1001 and is generally a desktop computer such as a PC and workstation and has various device profiles as in the case of the image processing apparatus 1001. The image processing apparatus 1001 of this embodiment creates a new profile through the same processing as that in the first embodiment and sends the profile to the external image processing apparatus 1002. Upon reception of the profile sent, the image processing apparatus 1002 updates its profile with the received profile. Hereafter, the image processing apparatus 1001 and the processing carried out by the image processing apparatus 1001 will be explained. In the following explanation, the profile to be updated is a printer profile, but the profile is not limited to the printer profile and it is also possible to use, for example, a monitor profile.

Reference numeral 1003 denotes an image output apparatus and is an apparatus that prints images on an image storage medium such as paper and OHP. This embodiment uses the image output apparatus 1003 as a printer, but the image output apparatus 1003 is not limited to a printer if it at least has the function of printing images on the above-described image storage medium. Reference numeral 1004 denotes the above-described sensor section, 1005 denotes a communication interface section for carrying out data communication between the image processing apparatus 1001 and the image processing apparatus 1002.

Reference numeral 1006 denotes a measurement data storage section 1006 that stores measurement data from the sensor section 1004, 1007 denotes a color conversion specific corresponding color/acceptable value storage section that stores corresponding colors for respective color conversions and their acceptable values (corresponding colors of respective color conversions and their acceptable values will be explained in detail later), 1008 denotes a color matching accuracy calculation section that calculates the color matching accuracy, 1009 denotes a color matching accuracy decision section that decides the color matching accuracy using the result of the accuracy calculated by the color matching accuracy calculation section 1008 and 1010 denotes a profile creation/updating section that creates or updates a device profile to be used for color matching (profile such as a printer profile, monitor profile, scanner/digital camera profile, etc. which will be described later).

Reference numeral 1011 denotes an operation/display section that displays images and character information and allows various commands to be input in a touch panel format, 1012 denotes a sensor control section that controls the sensor section 1004, 1013 denotes a data buffer that temporarily stores data to carry out data processing, 1014 denotes a monitor profile storage section that stores monitor profiles for their respective color conversion methods and 1015 denotes a printer profile storage section that stores printer profiles of the image output apparatus 1003, etc. for their respective color conversion methods.

<Overall Processing>

Figure 11:
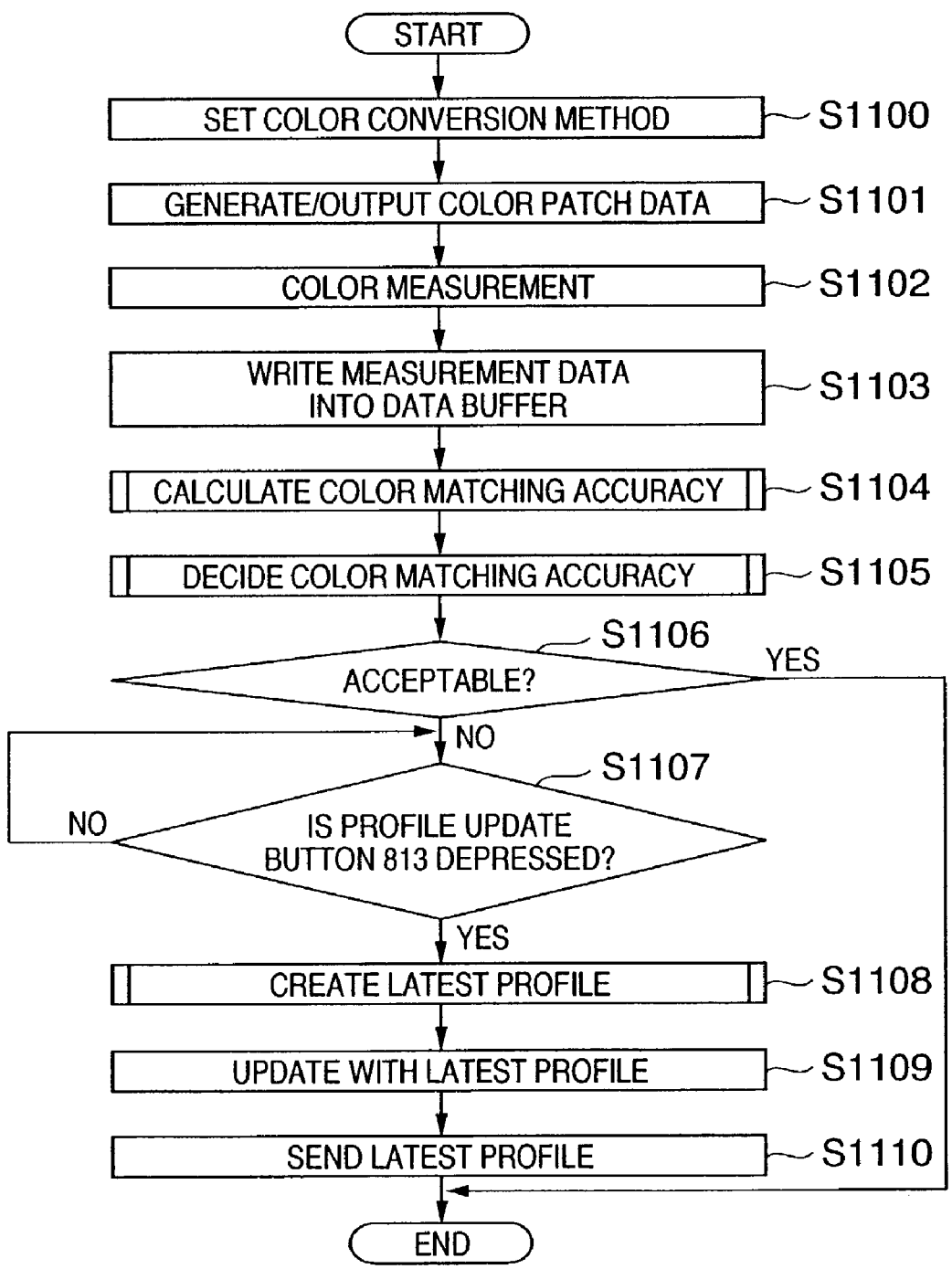
FIG. 11 is a flow chart of main image processing carried out by the image processing apparatus according to the second embodiment of the present invention.

FIG. 11 is a flow chart of main image processing carried out by the image processing apparatus according to this embodiment in the above configuration. In the flow chart shown in FIG. 11, the processes from step S1101 to step S1109 are almost the same as those from step S200 to step S209 and this embodiment is different in that the colors of color patches on the storage medium are measured not from the calorimeter 20 but using the sensor 1004 in step S1102. Thus, explanations of the processes from step S1100 to step S1109 will be omitted. Also suppose in this embodiment that the screen shown on the operation/display section 1011 is the GUI shown in FIG. 8.

In step S1110, the printer profile newly created in step S1108 is sent to the image processing apparatus 1002 via the communication interface section 1005. The image processing apparatus 1002 updates the printer profile stored with the printer profile received.

As explained above, by using a handy type image processing apparatus provided with a sensor section for color measurement, it is possible to verify the accuracy of color matching according to objective criteria based on human visual characteristics using, for example, the image processing apparatus 1002 and simply update the profile as appropriate, and since a service person, etc. holds the image processing apparatus 1001, it is possible to verify the accuracy of color matching according to objective criteria based on human visual characteristics from outside on the image processing apparatus 1002, send the result of the updated profile as appropriate and update the profile stored in the image processing apparatus 1002.

Third Embodiment

Figure 12:
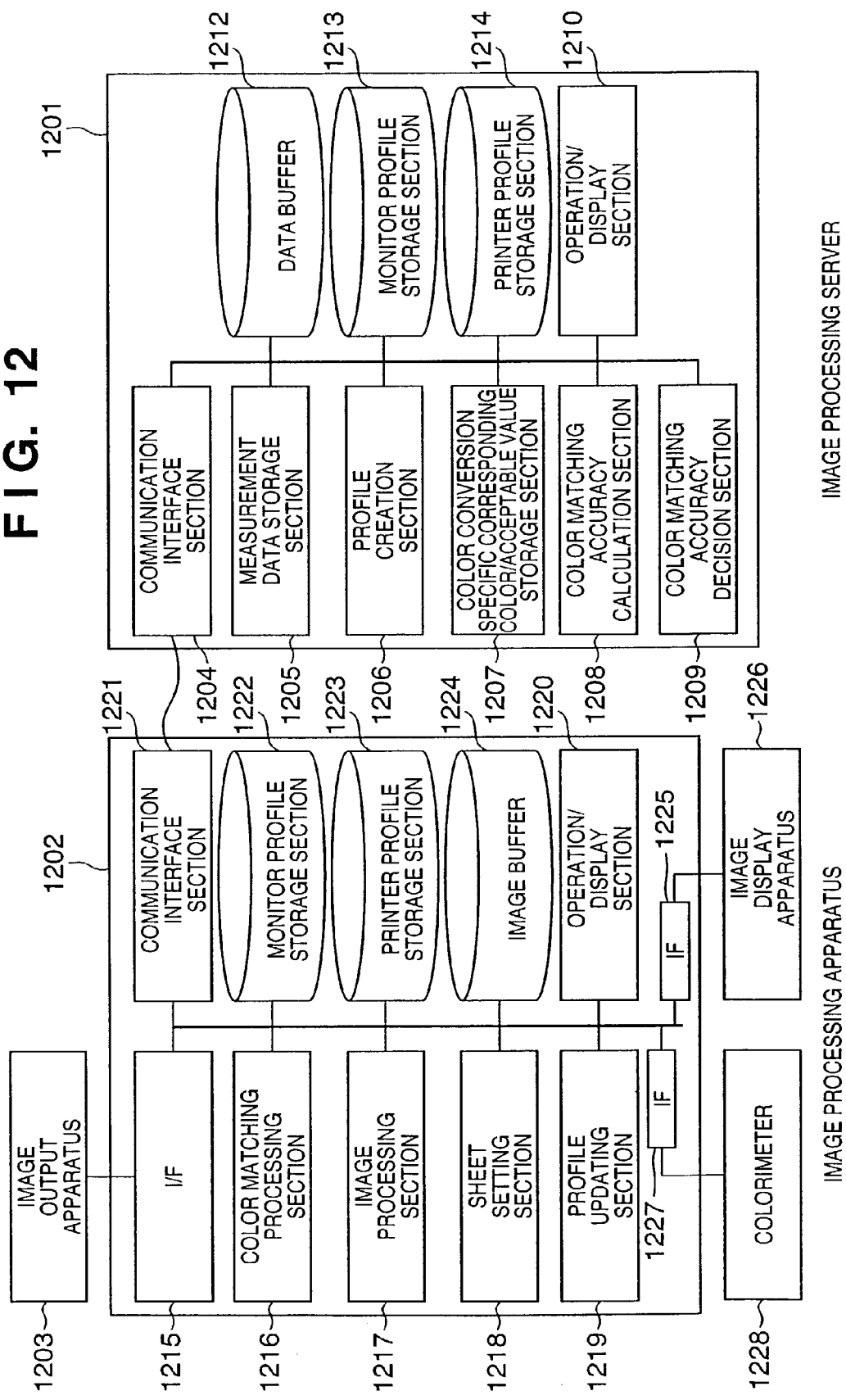
FIG. 12 is a block diagram showing functional configurations of an image processing apparatus on a server side and an image processing apparatus on a client side (hereinafter referred to as "image processing server") according to a third embodiment of the present invention.

FIG. 12 shows functional configurations of an image processing apparatus on a server side and an image processing apparatus on a client side (hereinafter referred to as "image processing server"). The image processing apparatus according to this embodiment sends measurement data to an image processing server, receives the latest profile created by the image processing server using the measurement data and updates its profile with the received profile. On the other hand, the image processing server calculates the accuracy of color matching using the measurement data received and if the accuracy is not acceptable, the image processing server creates a new profile and sends it to the image processing apparatus. The image processing apparatus, the image processing server and the processing carried out by these apparatuses will be explained below. In the following explanation, the profile to be updated is a printer profile, but the profile is not limited to the printer profile and it is also possible to use, for example, a monitor profile.

Reference numeral 1201 denotes an image processing server and has the following configuration. Reference numeral 1204 denotes a communication interface section for carrying out data communication between the image processing server 1201 and the image processing apparatus 1202, 1205 denotes a measurement data storage section that stores measurement data sent from the image processing apparatus 1202, 1207 denotes a color conversion specific corresponding color/acceptable value storage section that stores corresponding colors for respective color conversions and their acceptable values (corresponding colors of respective color conversions and their acceptable values will be explained in detail later), 1208 denotes a color matching accuracy calculation section that calculates the color matching accuracy, 1209 denotes a color matching accuracy decision section that decides the color matching accuracy using the result of the accuracy calculated by the color matching accuracy calculation section 1208 and 1206 denotes a profile creation section that creates a device profile to be used for color matching (profile such as a printer profile, monitor profile, scanner/digital camera profile, etc. which will be described later).

Reference numeral 1210 denotes an operation/display section that displays images and character information and allows various commands to be input in a touch panel format, 1212 denotes a data buffer that temporarily stores data to carry out data processing, 1213 denotes a monitor profile storage section that stores monitor profiles for their respective color conversion methods and 1214 denotes a printer profile storage section that stores printer profiles of the image output apparatus 1203, etc. for their respective color conversion methods.

Reference numeral 1202 denotes an image processing apparatus connected to the image processing server 1201 via a network such as the Internet and LAN. Reference numeral 1203 denotes an image output apparatus connected to the image processing apparatus 1202 via an I/F section 1215 to print images on an image storage medium such as paper and OHP. Reference numeral 1216 denotes a color matching processing section that performs color matching between the color displayed on an image display apparatus 1226 and the color output from the image output apparatus 1203 and 1217 denotes an image processing section that performs various types of image processing such as gradation conversion processing on an image to be output to the image output apparatus 1203.

Reference numeral 1218 denotes a sheet setting section that sets the type of an output sheet to be used for the image output apparatus 1203, 1219 denotes a profile updating section that updates a device profile to be used for color matching (profile such as a printer profile, monitor profile, scanner/digital camera profile, etc. which will be described later).

Reference numeral 1220 denotes an operation/display section that displays images and character information and allows various commands to be input in a touch panel format, 1221 denotes a communication interface section for carrying out data communication with the image processing server 1201, 1222 denotes a monitor profile storage section that stores monitor profiles of the image display apparatus 1226 for their respective color conversion methods and 1223 denotes a printer profile storage section that stores printer profiles of the image output apparatus 1203 for their respective color conversion methods.

Reference numeral 1224 denotes an image buffer that temporarily stores image data to be output to the image output apparatus 1203, 1225 denotes an I/F section to connect to the image display apparatus 1226, 1226 denotes an image display apparatus that is constructed of a CRT and LCD and displays images. Reference numeral 1228 denotes a calorimeter that measures colors of various color patches printed on the storage medium output from the image output apparatus 1203. Reference numeral 1227 denotes an I/F section to connect the calorimeter 1228 to the image processing apparatus 1202.

<Overall Processing>

Figure 13:
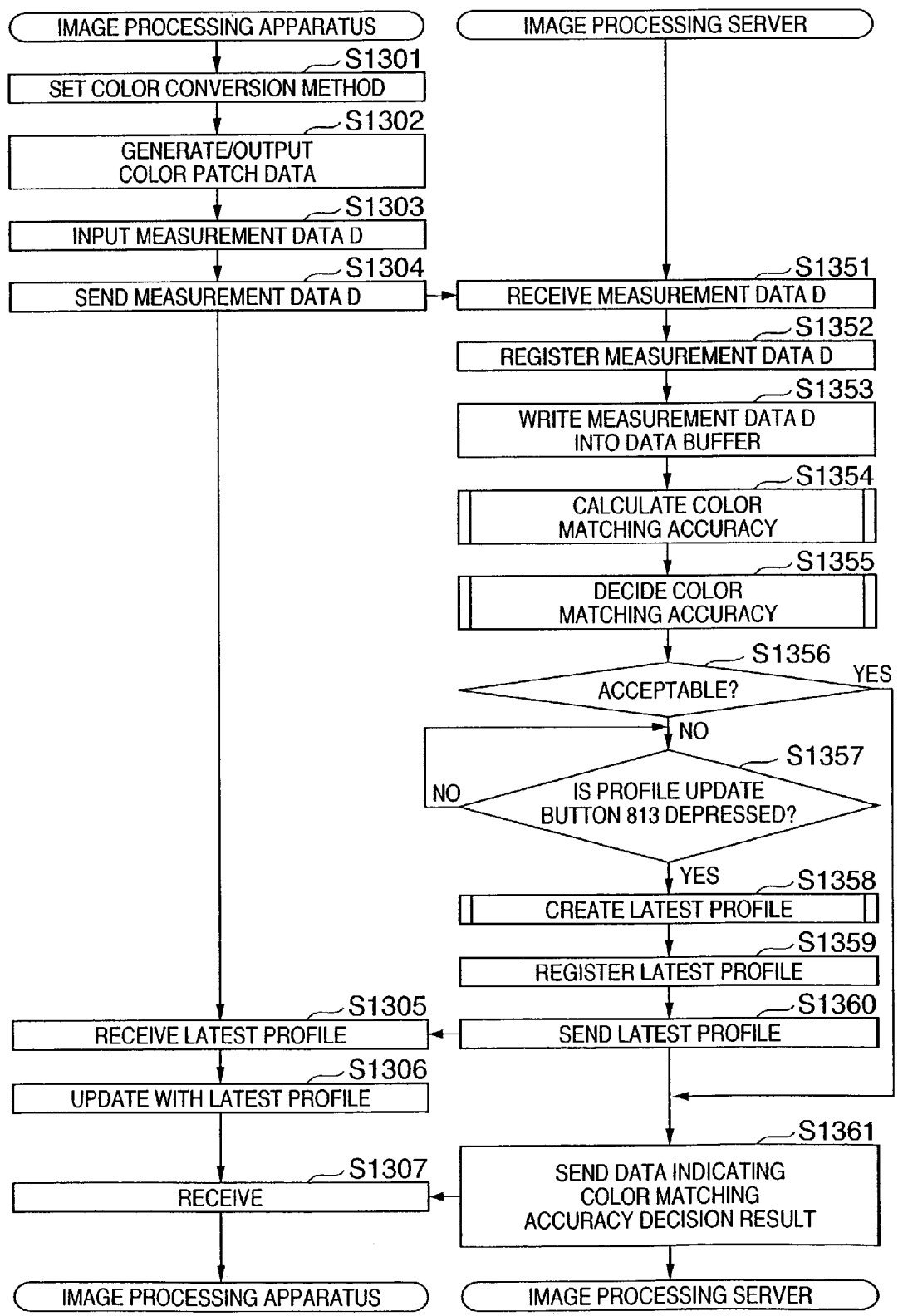
FIG. 13 is a flow chart of main processing carried out by the image processing apparatus and image processing server according to the third embodiment of the present invention.

FIG. 13 is a flow chart of main processing carried out by the image processing apparatus and image processing server in the above-described configuration. The processes from step S1301 to step S1303 carried out by the image processing apparatus 1202 are almost the same as those from step S200 to step S202, and therefore explanations thereof will be omitted. Also suppose in this embodiment that the screen shown on the operation/display sections 1220 and 1210 is the GUI shown in FIG. 8.

In step S1304, the measurement data of the calorimeter 1228 is sent to the image processing server 1201 via the communication interface section 1202. Upon receipt of the measurement data in step S1351, the image processing server 1201 registers the measurement data in the measurement data storage section 1205 in step S1352 and writes the measurement data into the data buffer 1212 in step S1353.

The processes from step S1354 to step S1358 are almost the same as those in step S204 to step S208 and are different in that the latest printer profile is created by the profile creation section 1206. Thus, explanations of the processes from step S1354 to step S1358 will be omitted. Then, in step S1359, the printer profile storage section 1214 creates a printer profile according to the color conversion method selected and set in step S1301 and registers it as the latest printer profile. Then, in step S1360, the latest printer profile created via the communication interface section 1204 is sent to the image processing apparatus 1202.

When the image processing apparatus 1202 receives the measurement data in step S1305, the profile updating section 1219 updates the printer profile according to the color conversion method selected and set in step S1301 inside the printer profile storage section 1223 with the received printer profile in step S1306.

Furthermore, the image processing server 1201 sends the data indicating the color matching result (data indicating "acceptable" or "rejected", data indicating the calculated accuracy) via the communication interface section 1204 in step S1361 and the image processing apparatus 1202 receives this data in step S1307.

As explained above, even if the image output apparatus and the apparatus for calculating the accuracy of color matching (image processing server) are located in different places (especially remote locations), it is possible to calculate the accuracy of color matching according to objective criteria based on the human visual characteristics and simply update profiles as appropriate.

Fourth Embodiment

The above-described embodiment updates a profile of the image output apparatus (printer profile), but it is also possible to adopt a configuration in such a way as to update the profile of the image input apparatus or the profile of the image display apparatus (monitor profile). That is, in order to improve the accuracy of color matching, it is possible to adopt a configuration in such a way as to update profiles of the image output apparatus, image input apparatus or image display apparatus as appropriate. Instead of updating profiles, it is also possible to adopt a configuration that changes the color matching method. It goes without saying that it is also possible to combine updating of profiles and a change of the color matching method.

In that case, a button for updating the monitor profile, etc. is provided in addition to the printer profile.

Furthermore, the above-described embodiment calculates color reproduction index $CRIn$ of each color patch using a lightness error, chroma error and hue error and further calculates a mean value of all $CRIn$'s to determine color reproduction index $CRI$, but this is not the only method. Other methods can also be used, for example, calculating a mean value of lightness errors, mean value of chroma errors and mean value of hue errors, providing thresholds for respective mean values and carrying out threshold processing and deciding acceptance/rejection.

Fifth Embodiment

The above-described embodiment calculates the accuracy of color matching between the corresponding color for the color displayed on the image display apparatus and the color obtained by outputting the color displayed on the image display apparatus to the image output apparatus, but it is also possible to connect, for example, the image processing apparatus to the image output apparatus and input, if the color output from the image output apparatus does not match the user's preference, the color of the user's preference to the image processing apparatus and find color matching between the corresponding color of the input color and the color obtained by measuring the color output from the above-described image output apparatus using a calorimeter. Then, it is possible to display the acceptance/rejection result of the accuracy on the GUI according to the accuracy of the color matching as described in the first embodiment and then create a printer profile.

Thus, when the color displayed or output by the image output apparatus and image display apparatus, etc. is not the color of the user's preference, it is possible to input this desired color, find the accuracy of color matching between the corresponding color of the input desired color and the displayed and output color above and update the profile according to the result.

As the method of selecting the corresponding color for the desired color, it is possible to search for the color that matches the desired color most out of a plurality of corresponding colors and use it as the corresponding color for this color.

Other Embodiments

By the way, the present invention is applicable to a system constructed of a plurality of apparatuses (e.g., host computer, interface apparatus, reader and printer, etc.) or applicable to an apparatus made up of a single device (e.g., copier, facsimile apparatus, etc.).

It goes without saying that the object of the present invention is also attained by supplying a storage medium that records program codes of software which implements the functions of the aforementioned embodiments to a system or apparatus and allowing a computer (or CPU or MPU) of the system or apparatus to read and execute the program codes stored in the storage medium.

In this case, the program codes read from the storage medium themselves implement the functions of the aforementioned embodiments and the storage medium that stores the program codes constitutes the present invention.

As the storage medium for supplying program codes, it is possible to use, for example, a floppy disk, hard disk, optical disk, magneto-optical disk, CD-ROM, CD-R, magnetic tape, non-volatile memory card, ROM, etc.

Furthermore, it goes without saying that the present invention also includes the case where not only the functions of the aforementioned embodiments are implemented by executing the program codes read by the computer but also the OS (operating system) operating on the computer performs part of actual processing based on instructions of those program codes and implements the functions of the aforementioned embodiments through the processing.

Furthermore, it goes without saying that the present invention also includes the case where the program codes read from the storage medium are written into memory provided for a function expansion board inserted in the computer or a function expansion unit connected to the computer, and then the CPU, etc. provided for the function expansion board or function expansion unit performs part or whole of the actual processing based on instructions of those program codes and implements the functions of the aforementioned embodiments through the processing.

As described above, the present invention makes it possible to calculate the accuracy of color matching according to objective criteria based on human visual characteristics. Furthermore, the present invention also makes it possible to verify the accuracy of color matching according to objective criteria based on human visual characteristics for each color conversion content and update profiles as appropriate and thereby perform color matching with a high degree of accuracy.

The present invention is not limited to the above embodiments and various changes and modifications can be made within the spirit and scope of the present invention. Therefore to apprise the public of the scope of the present invention, the following claims are made.

What is claimed is:

1. An image processing apparatus comprising:
    storing means that stores data of an input color group including at least one color, data of a corresponding color group made up of colors obtained by allowing an image output apparatus to output the colors of the input color group, the colors of the corresponding color group having a preset relationship with the colors of the input color group, and data of an acceptable range of the corresponding color group which is provided according to type of paper sheet used by the image output apparatus;
    setting means for setting a type of paper sheet used by the image output apparatus;
    inputting means for inputting, from outside said image processing apparatus, data indicating a color group obtained by allowing the image output apparatus to print the input color group on paper sheet of the type set by said setting means and then measuring colors on the printed paper sheet;
    calculating means for calculating a lightness error, chroma error and hue error using the input data inputted by said inputting means, the data of the corresponding color group stored in said storing means, and the data of the acceptable range corresponding to the type set by said setting means stored in said storing means, and further calculating a color reproduction index for color matching using these errors;
    profile storing means for storing profiles of devices including said image output apparatus; and
    notifying means for deciding whether a profile of any one of the devices stored in said profile storing means will be updated or not based on the color reproduction index, and notifying a user of the decision result.

2. The image processing apparatus according to claim 1, wherein said storing means stores the data of the input color group and the data of the corresponding color group for each color conversion method.

3. The image processing apparatus according to claim 1,
    wherein said calculating means calculates a value based on the lightness difference, a value based on the chroma difference and a value based on the hue difference using the input data inputted by said inputting means, the data of the corresponding color group stored in said storing means, and the data of the acceptable range stored in said storing means,
    calculates the square root of the sum of squares of the respective values for each color, and
    further calculates a mean value of the square root value calculated for each color as a reproduction index of the color matching.

4. The image processing apparatus according to claim 3, wherein said notifying means, when the mean value is greater than the predetermined threshold, notifies the user that the profile of any one of the devices will be updated.

5. The image processing apparatus according to claim 3, wherein said notifying means further notifies the user of the square root value for each color.

6. The image processing apparatus according to claim 3, further comprising updating means for updating and controlling any one of the profiles of the devices.

7. The image processing apparatus according to claim 6, further comprising transmitting means for transmitting the profiles updated by said updating means to an external apparatus.

8. An image processing method for use with an image processing apparatus, comprising the steps of:
    storing data of an input color group including at least one color, data of a corresponding color group made up of colors obtained by allowing an image output apparatus to output the colors of the input color group, the colors of the corresponding color group having a preset relationship with the colors of the input color group, and data of an acceptable range of the corresponding color group which is provided according to type of paper sheet used by the image output apparatus;
    setting a type of paper sheet used by the image output apparatus;
    inputting, from outside the image processing apparatus, data indicating a color group obtained by allowing the image output apparatus to print the input color group on paper sheet of the type set in said setting step and then measuring colors on the printed paper sheet;

calculating a lightness error, chroma error and hue error using the data inputted in said inputting step, the data of the corresponding color group data stored in said storing step, and the data of the acceptable range corresponding to the type set in said setting step stored in said storing step, and further calculating a color reproduction index for color matching using these errors;

storing, in profile storage, profiles of devices including the image output apparatus; and deciding whether a profile of any one of the devices stored in said profile storing step will be updated or not based on the color reproduction index, and notifying a user of the decision result.

9. An image processing apparatus according to claim 1, further comprising:

a plurality of color converting means;

wherein said calculating means for calculating accuracy of a color conversion of said color converting means, using the data of the corresponding color group stored in said storing means, and the data of an acceptable range corresponding to the type set by said setting means, and the input data inputted by said input means.

10. The image processing apparatus according to claim 9, wherein said accuracy calculating means is means for calculating a difference between a corresponding color of the output image signal for the preset input image signal and the color-converted output image signal based on visual characteristics.

11. The image processing apparatus according to claim 9, wherein the acceptable value used by said accuracy calculating means is a value which is preset for each hue, chroma and lightness and which reflects visual characteristics.

12. The image processing apparatus according to claim 9, wherein the corresponding color or the acceptable value used by said accuracy calculating means is preset for each of the plurality of color conversions.

13. A computer-readable storage medium storing a program for causing a computer to execute the image processing method according to claim 8.

* * * * *

UNITED STATES PATENT AND TRADEMARK OFFICE
CERTIFICATE OF CORRECTION

| | |
|---|---|
| PATENT NO. | : 7,420,705 B2 |
| APPLICATION NO. | : 10/235813 |
| DATED | : September 2, 2008 |
| INVENTOR(S) | : Osamu Yamada et al. |

It is certified that error appears in the above-identified patent and that said Letters Patent is hereby corrected as shown below:

COLUMN 8:

Line 47, "amaximum" should read --a maximum--; and
Line 63, "Instep S315," should read --In step S315,--.

COLUMN 9:

Line 11, "1" should read --1,--.

COLUMN 11:

Line 19, "etc." should read --etc.,--;
Line 30, "etc." should read --etc.,--; and
Line 56, "etc." should read --etc.,--.

COLUMN 12:

Line 37, "etc." should read --etc.,--;
Line 46, "etc." should read --etc.,--; and
Line 67, "etc." should read --etc.,--.

COLUMN 14:

Line 19, "etc." should read --etc.,--; and
Line 53, "etc." should read --etc.,--.

COLUMN 15:

Line 32, "etc." should read --etc.,--.

UNITED STATES PATENT AND TRADEMARK OFFICE
CERTIFICATE OF CORRECTION

PATENT NO. : 7,420,705 B2
APPLICATION NO. : 10/235813
DATED : September 2, 2008
INVENTOR(S) : Osamu Yamada et al.

It is certified that error appears in the above-identified patent and that said Letters Patent is hereby corrected as shown below:

<u>COLUMN 16</u>:

Line 66, "paper" should read --a paper--.

<u>COLUMN 17</u>:

Line 16, "means;" should read --means,--.

Signed and Sealed this

Twenty-fourth Day of February, 2009

JOHN DOLL
*Acting Director of the United States Patent and Trademark Office*